(12) United States Patent
Nepveu (10) Patent No.: US 9,625,721 B2
(45) Date of Patent: Apr. 18, 2017

(54) METHOD, DIGITAL IMAGE PROCESSOR AND VIDEO DISPLAY SYSTEM FOR DIGITALLY PROCESSING A VIDEO SIGNAL

(75) Inventor: Bertrand Nepveu, Montreal (CA)

(73) Assignee: VRVANA INC., Montreal, Quebec (CA)

( * ) Notice: Subject to any disclaimer, the term of this patent is extended or adjusted under 35 U.S.C. 154(b) by 344 days.

(21) Appl. No.: 13/635,799

(22) PCT Filed: Mar. 18, 2011

(86) PCT No.: PCT/CA2011/000294
§ 371 (c)(1),
(2), (4) Date: Sep. 18, 2012

(87) PCT Pub. No.: WO2011/113152
PCT Pub. Date: Sep. 22, 2011

(65) Prior Publication Data
US 2013/0016193 A1    Jan. 17, 2013

Related U.S. Application Data

(60) Provisional application No. 61/282,718, filed on Mar. 22, 2010.

(30) Foreign Application Priority Data

Mar. 19, 2010    (CA) ..................................... 2696925

(51) Int. Cl.
G02B 27/01    (2006.01)
H04N 13/00    (2006.01)
H04N 13/04    (2006.01)

(52) U.S. Cl.
CPC ....... *G02B 27/017* (2013.01); *H04N 13/0007* (2013.01); *H04N 13/044* (2013.01);
(Continued)

(58) Field of Classification Search
None
See application file for complete search history.

(56) References Cited

U.S. PATENT DOCUMENTS

| 6,833,843 B2 * | 12/2004 | Mojaver | ................... G06T 3/00 345/427 |
| 2004/0008157 A1 * | 1/2004 | Brubaker | ........... G02B 27/0176 345/8 |

(Continued)

*Primary Examiner* — Reza Aghevli
(74) *Attorney, Agent, or Firm* — Praxis (57) ABSTRACT

A headset system connectable to a video source for receiving a video signal through a wired or wireless communication link comprises a head mounted device, a user interface and a base station. The head mounted device displays a video image to the user via an integrated video display and also comprises an integrated data image processor and optical lenses positioned in front the video display. The data image processor effects high speed real time modification of an image frame of the video signal. The video display is in communication with the data image processor for displaying processed images from the digital image processor. The user interface allows for building a user profile and storing the user profile in the memory of the digital image processor. The base station comprises an input interface connectable to the communication link, and an output interface for forwarding the communication signal to the video display.

10 Claims, 5 Drawing Sheets

(52) U.S. Cl.
 CPC .. *G02B 2027/011* (2013.01); *G02B 2027/014* (2013.01); *G02B 2027/0118* (2013.01); *G02B 2027/0134* (2013.01)

(56) References Cited

U.S. PATENT DOCUMENTS

| | | | | |
|---|---|---|---|---|
| 2004/0008208 | A1* | 1/2004 | Dresevic | G06F 1/1607 345/589 |
| 2004/0119662 | A1* | 6/2004 | Dempski | G01S 3/7864 345/8 |
| 2005/0078278 | A1* | 4/2005 | Uehara | G02B 27/1046 353/20 |
| 2005/0078378 | A1* | 4/2005 | Geist | G02B 27/0172 359/630 |
| 2006/0017657 | A1* | 1/2006 | Yamasaki | G02B 27/017 345/8 |
| 2006/0072215 | A1* | 4/2006 | Nishi | G02B 13/06 359/708 |
| 2007/0236514 | A1* | 10/2007 | Agusanto | A61B 1/00193 345/646 |
| 2008/0252784 | A1* | 10/2008 | Morita | G06F 19/3406 348/552 |
| 2009/0161017 | A1* | 6/2009 | Glen | H04N 21/84 348/624 |
| 2009/0189830 | A1* | 7/2009 | Deering | G09G 3/02 345/1.3 |
| 2009/0213038 | A1* | 8/2009 | Huang | G02B 27/017 345/8 |
| 2009/0237492 | A1* | 9/2009 | Kikinis | H04N 13/0497 348/47 |
| 2010/0013910 | A1* | 1/2010 | Farr | G02B 7/001 348/51 |
| 2010/0060722 | A1* | 3/2010 | Bell | G06F 3/017 348/51 |

* cited by examiner

METHOD, DIGITAL IMAGE PROCESSOR AND VIDEO DISPLAY SYSTEM FOR DIGITALLY PROCESSING A VIDEO SIGNAL

TECHNICAL FIELD

The present disclosure generally relates to conversion of video signals into images and, more specifically, to a method, a digital image processor and a video display system for digitally processing a video signal.

BACKGROUND

In many circumstances, display systems are used in cooperation with electronic signal processing means to display information on screens, such as organic light emitting diode (OLED) or liquid crystal display (LCD) screens, to be viewed by individuals. Such systems may be integrated for example into head mounted devices (HMD) such as stereoscopic headsets usable in gaming, vision evaluation, psychological testing, training, etc. Typically, images to be displayed are generated by a computer using appropriate software such as game software, and converted into an electronic signal which is sent to a displaying device through a wired or wireless communication link. The signal is continuously decoded in the device and images are displayed on one or two screens in the device.

In order to integrate the display screens into the HMD and enable the user to view the images, optical elements are used to direct and focus the images on the user's eyes according to a predetermined direction of view. Moreover, in order to provide a viewing experience which is as realistic as possible, a wide field of view is desirable to improve immersion. However, the more the HMD is compact, the more the optical elements are solicited to provide good image definition and realistic viewing experience. Different aberrations may occur due to the border effect of the small lenses (such as the so called fish eye effect) and other effects generated by the optical elements, such as loss of luminosity, contrast, color alterations, etc. This is more particularly true when plastic or lower grade optical elements are used to meet targeted production costs for commercial products such as gaming headsets. In stereoscopic devices, undesired discrepancies may also arise between images generated by one screen and those generated by the second screen.

Image perception according to the user point of view may also be considered. Regardless of the quality and similitude of the images generated at a left eye screen and at a right eye screen, they may be perceived with differences which are not present in the projected images because of the personal vision characteristics of the user. Such differences may further be different from one eye to the other and may for example result from astigmatism, some degree of color-blindness, squinting, and the like, and may affect the quality of a viewing experience, and more particularly the realism of a stereoscopic program.

SUMMARY

The present disclosure therefore provides a method, a digital image processor and a video display system for digitally processing a video signal.

In accordance with an aspect of the present disclosure, there is provided a method of displaying a video signal. The video signal is digitally processed according to a user profile. The video signal is also digitally processed according to a device parameter of a video display system. The processed video signal is displayed on the video display system.

According to another aspect of the present disclosure, a digital image processor. The digital image processor comprises a compensator for digitally processing a video signal according to a user profile and according to a device parameter of a video display system. The digital image processor also comprises an output for forwarding the processed video signal towards the video display system.

According to a further aspect of the present disclosure, a video display system, comprising a media input interface, a digital image processor and a display. The media input interface receives a video signal. The digital image processor edits images of the video signal according to a user profile and according to a device parameter of the video display system. Processed images from the digital image processor are displayed on the display.

The foregoing and other features will become more apparent upon reading of the following non-restrictive description of illustrative embodiments thereof, given by way of example only with reference to the accompanying drawings.

DETAILED DESCRIPTION

The present disclosure generally addresses the problem of displaying video images while taking into account a user profile of a viewer and a parameter of a video display system.

The following terminology is used throughout the present disclosure:
  Video signal: any analog or digital signal carrying image frames;
  Source of a video signal: any device capable of providing a series of image frames, whether these are actual image representations, recorded images or synthesized images;
  Source parameter: a parameter representing a characteristic of the source of the video signal;
  Monoscopic: manner of showing images in two (2) dimensions (2D), using a single image flow;
  Stereoscopic: manner of showing images in three (3) dimensions (3D), using two associated image flows;
  Video decoding: analog or digital conversion of a video protocol to a sequence of image frames;
  Digital processing: treatment of a digital video signal or frame by a digital processor;
  User profile: one or more preferences or characteristics of a viewer of a video signal, related to eye aberrations or to an intended variation in image processing; the user profile may comprise distinct parameters related to a left and a right eye or to an intended variation in image processing for viewing on the left and the right eye;

Video display system: one or more display screens and associated optical components for displaying the video signal, also comprising other related components;

Device parameter: one or more characteristics of the video display system;

Compensation: digital processing of the video signal according to the user profile or according to a device parameter;

Aberration: a visual disorder or dysfunction of one or both eyes of a viewer or a defect of the video display system, the detect causing an image distortion, color fading, loss of sharpness, loss of brightness or any similar perceived image degradation;

RGB: red, green and blue color model of a video signal, also used to represent distinct colored components of the video signal;

Pre-configured: used in relation to parameters permanently or semi-permanently resident in a system;

Image matrix: representation of an image in a series of rows and columns;

Image block: an intersection of a row with a column, in the image matrix;

Conversion matrix: image conversion factors in a series of rows and columns;

Conversion block: an intersection of a row with a column, in the conversion matrix;

Pixel-wise: pixel by pixel processing, in which a block size of the image matrix and of the conversion matrix is equal to one (1) pixel;

Memory: device or component capable of storing digital information for subsequent retrieval;

Media: a communication channel;

Editing: image conversion by digital processing;

Headset: a device wearable by a user, for displaying a video signal; and

Base station: a component of a video display system, separate from the headset.

Figure 1:
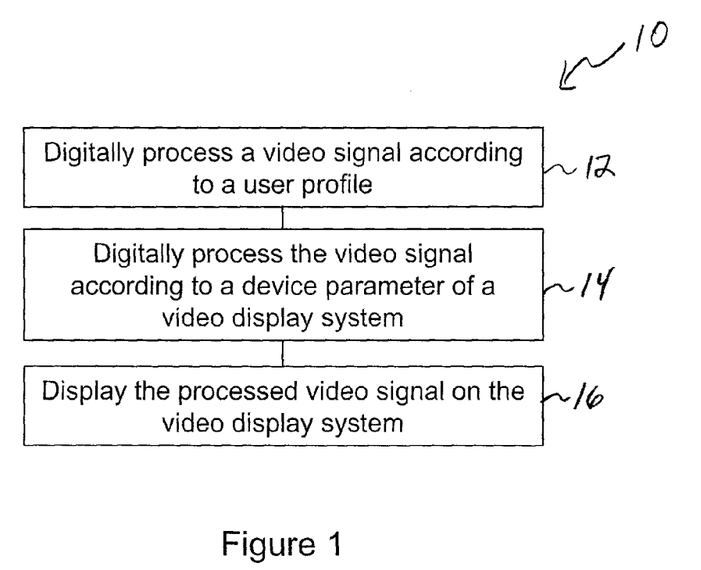
FIG. 1 is a sequence of steps of an exemplary method of displaying a video signal.

In an aspect, the present disclosure introduces a method of displaying a video signal. Referring to the Drawings, FIG. 1 is a sequence 10 of steps of an exemplary method of displaying a video signal. The video signal is digitally processed according to a user profile (step 12). The video signal is also digitally processed according to a device parameter of a video display system (step 14). The processed video signal is displayed on the video display system (step 16).

Figure 2:
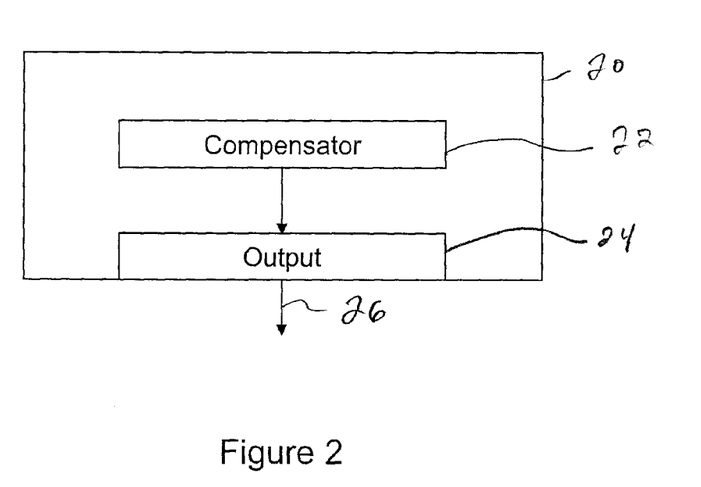
FIG. 2 is an example of a digital image processor.

FIG. 2 is an example of a digital image processor. A digital image processor 20 comprises a compensator 22 and an output 24. The compensator 22 digitally processes a video signal according to a user profile and according to a device parameter of a video display system. The output 24 forwards a processed video signal 26 towards the video display system.

Figure 3:
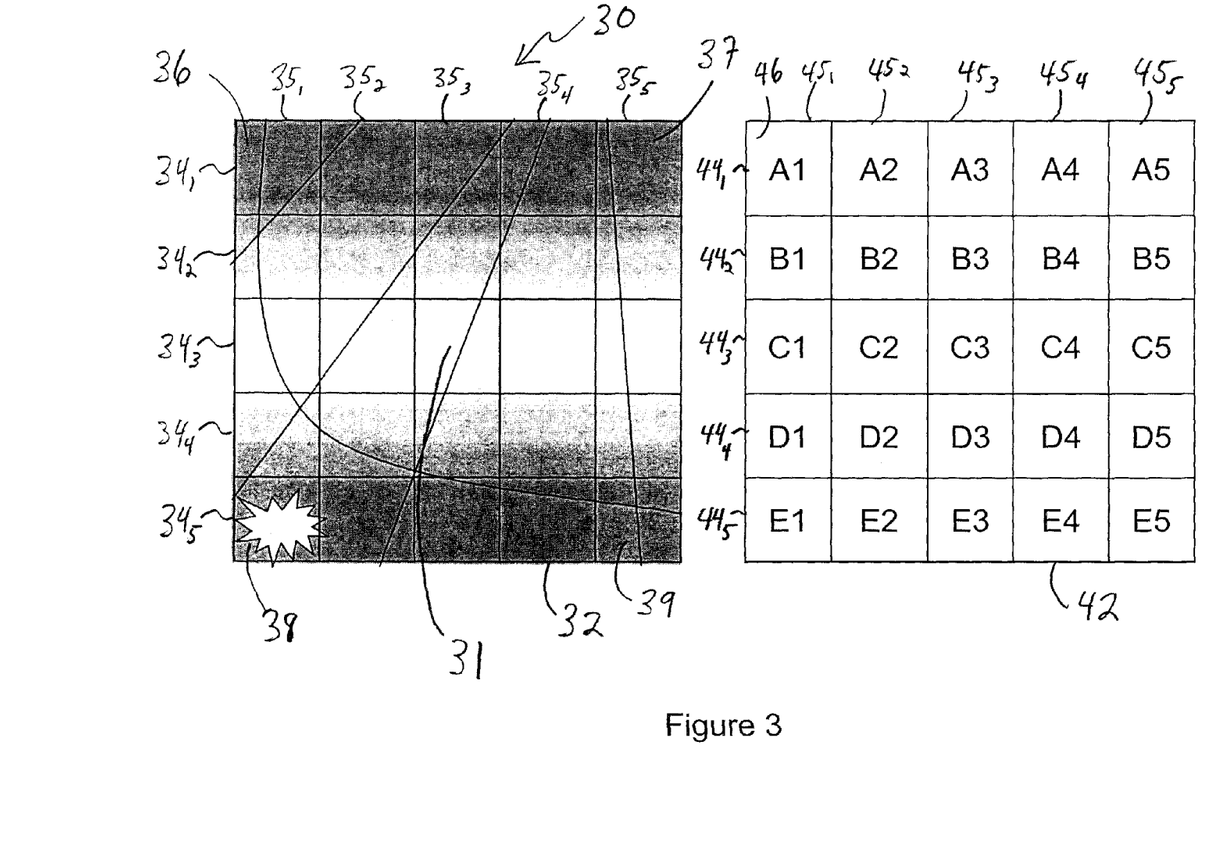
FIG. 3 shows an image matrix and a corresponding conversion matrix according to an aspect.

In some embodiments, the sequence of steps of FIG. 1 and the digital image processor of FIG. 2 may implement a matrix-based compensation process. FIG. 3 shows an image matrix and a corresponding conversion matrix according to an aspect. A video signal supplies a series of images, or frames, for example an image 30. The image 30 is divided into blocks of an image matrix 32. The image matrix 32 is exemplary and comprises five (5) rows $34_{1-5}$ and five (5) columns $35_{1-5}$. An image matrix may comprise any number of rows and columns, and a number of rows may differ from a number of columns. An intersection of a row with a column of the image matrix 32 forms an image block, for example image block 36 formed by the intersection of row $34_1$ with column $35_1$. A conversion matrix 42 is defined. The conversion matrix 42 is sized to match the image matrix 32 and also comprises a plurality of rows and columns, for example five (5) rows $44_{1-5}$ and five (5) columns $45_{1-5}$. An intersection of a row with a column of the conversion matrix 42 forms a conversion block, for example conversion block 46 formed by the intersection of row $44_1$ with column $45_1$. Each block of the conversion matrix comprises a compensation factor A1-A5, B1-B5, C1-C5, D1-D5 and E1-E5 to be applied for compensating a corresponding block of the image matrix 32 when digitally processing the video signal that comprises the series of images such as the image 30. The compensation factors of the conversion matrix 42 are calculated based on a user profile and on a device parameter of a video display system. As a non-limiting example, compensation factors A1, A5, E1 and E5 may slightly zoom corresponding blocks 36, 37, 38 and 39 of the image matrix 32 in order to attenuate a so-called fish-eye effect of the video display system, when this type of aberration is specified by the device parameter. As another non-limiting system, compensation factor C3 may increase a brightness of a central image block 31 of the image matrix 32, according to a characteristic desired by a user, as indicated in the user profile.

In a particular implementation, the size of the blocks of the image matrix 32 and of the conversion matrix 42 is set to one pixel, providing a pixel-wise conversion matrix 42 for compensating each pixel of image frames of a video signal with a corresponding pixel of the conversion matrix 42. For example, a high definition video signal may have a 1280-pixel horizontal resolution and a 720-pixel vertical resolution, in which case the image matrix 32 and the conversion matrix 42 may each be sized at 921,600 pixels.

A single conversion matrix 42 may be used to compensate the video signal at once based on the user profile and on the device parameter of the video display system. Alternatively, two separate conversion matrixes may be used in sequence for separately compensating the video signal based on the user profile and on the device parameter, or for compensating the video signal for a left image and a right image separately.

Various types of parameters may form the user profile. A given user profile may comprise one or more parameters. In an embodiment, the user profile is used for compensating for an aberration of an eye of a user. Likewise, various types of device parameter may be contemplated. In another embodiment, a device parameter may be used for compensating for an aberration of a video display system. Alternately, both user eye aberration and aberration of the video display system may be concurrently compensated.

In monoscopic (2D) applications, a video signal generally comprises a single video feed, providing a single series of image frames for display on a single display screen. Stereoscopic (3D) applications generally comprise two video feeds, or a compound signal separable into two video feeds, providing two associated suites of image frames for display on two screens. The steps of the sequence 10 of FIG. 1, the processes of the compensator 22 of FIG. 2, and the matrixes 32 and 42 of FIG. 3 may thus be duplicated for separately processing a left component and a right component of a video signal. Hence, the left component of the video signal may be processed according to a parameter of a left eye of the user and according to a parameter of a left component of the video display system. The right component of the video signal may be processed according to a parameter of a right eye of the user according to a parameter of a right component of the video display system.

Color video signals are generally formed of three colored components, according to a RGB color model. Different wavelengths of the red, green and blue components of a video signal may lead to different aberrations of the eyes of a user, to different aberrations of components of a video display system, or to different perceptions by the user. In an embodiment, the sequence 10 of FIG. 1, the compensator 22 of FIG. 2, and the matrixes 32 and 42 of FIG. 3 may separately process a red component, a blue component and a green component of the video signal.

Figure 4:
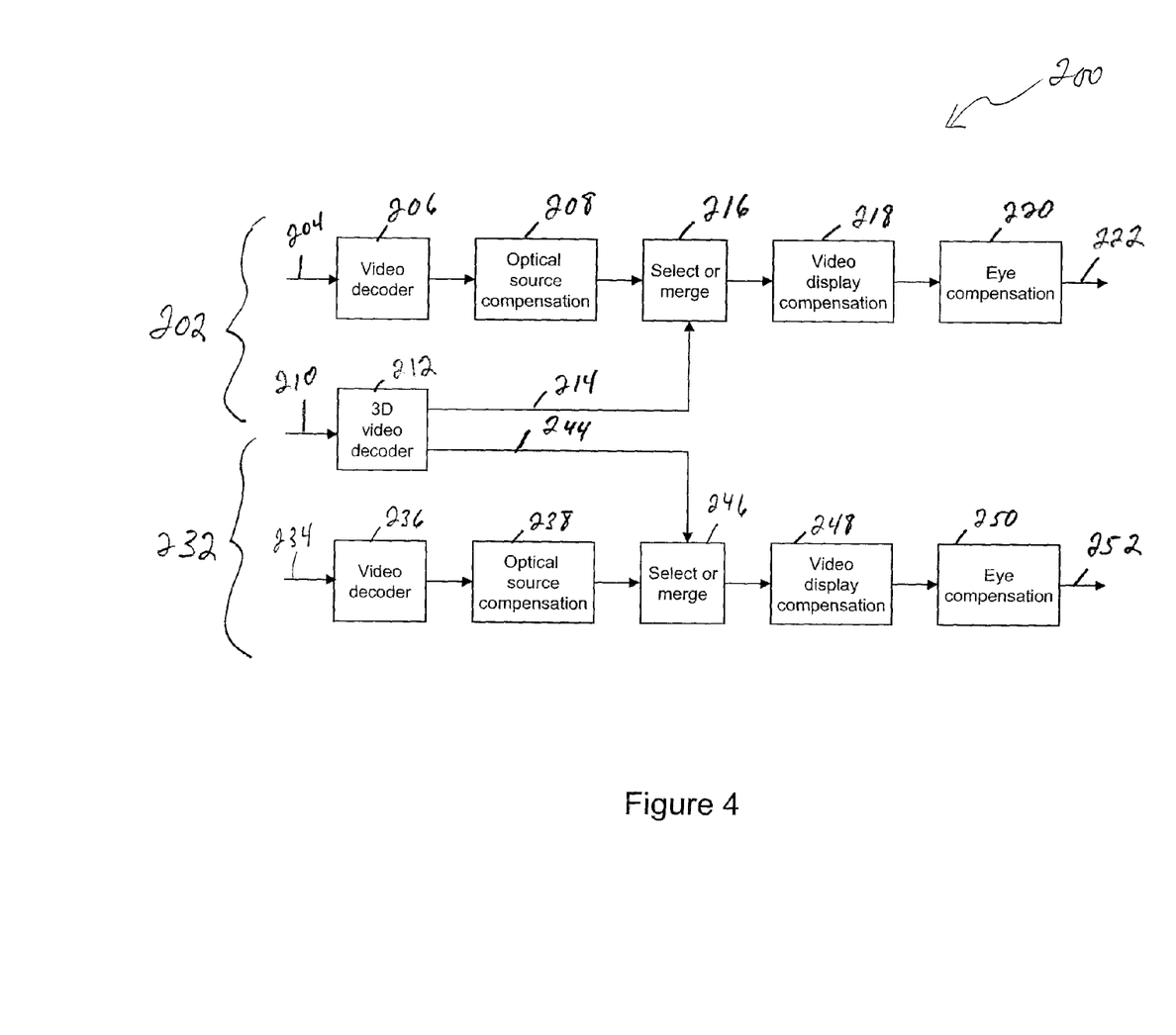
FIG. 4 is an example of a workflow showing steps for digitally processing video signals.

FIG. 4 is an example of a workflow showing steps for digitally processing video signals. A workflow 200 shows a right branch 202 and a left branch 232 of a 3D video signal processing method applied for use in a 3D video display system. For a monoscopic (2D) video signal for use in a 2D video display system, only one of the branches 202 and 232 may be present.

A video signal 204 is received from a right source, for example from a right camera, or from a single camera, for 2D applications. A video decoder digitizes images frames from the video signal 204 at step 206, when the video signal 204 is provided in analog format, or decodes the video signal 204 from a digital protocol to images frames. An optical source compensation based on a source parameter related to the source of the video signal 204 may be provided by digital processing in order to overcome any optical aberration of the right camera at step 208.

Alternatively, a signal having video components 210 may be obtained from another source, for example from a gaming device, from a computer or from a similar device. The signal 210 is treated by a 3D video decoder at step 212 to provide a right video signal 214 representative of a gaming or like application, or a single video signal 214 for monoscopic applications. At step 216, a selector makes a selection between the video signal 204, having been decoded at step 206 and possibly having been compensated at step 208, and the video signal 214 received from two distinct sources. In an embodiment, the selector may optionally merge the two video signals 204 and 214 at step 216, for example for providing an augmented reality visual application based on the video signal 204 from the right camera and based on the signal 210 originated from the augmented reality visual application.

A video output from the selector, from step 206, is processed, or compensated, at step 218, according to a device parameter of a right video display of the video display system. The video output of the selector is also processed, or compensated, at step 220, according to a user profile, for example to compensate for a right eye aberration of a user. The steps 218 and 220 may be executed in any order and may be combined in a single digital processing step. In an embodiment, each of the video display compensation step 218 and of the eye compensation step 220 may be realized using a distinct conversion matrix. In another embodiment, both compensation steps 218, 220, may be implemented using a common conversion matrix. Regardless, a resulting, digitally processed video signal 222 may be displayed on a right display device, or on a single display device for 2D applications.

In the case of 3D applications, the left branch 232 is similar to the right branch 202 and comprises either a video signal 234 from a left camera, applied to a video decoder at step 236 and potentially to an optical source compensation at step 238, or a left video signal 244 from the 3D video decoding step 212, or both. At step 246, a selector selects one of the video signals 234 or 244, or merges these two video signals. A video output from the selector is compensated according to a device parameter of a left video display at step 248 and according to a user profile, for example to compensate for a left eye aberration of a user, at step 250. A resulting, digitally processed video signal 252 is for visual display on a left display device.

The user profile may, for each eye of the user, comprise information related to eye aberrations. For example, a left eye of the user may suffer from strong astigmatism while a right eye suffers from lesser astigmatism and from squinting. A device parameter of the left and right video displays may be related to imperfect curvatures of their optical elements, these imperfections being possibly different between the left display and the right display.

Figure 5:
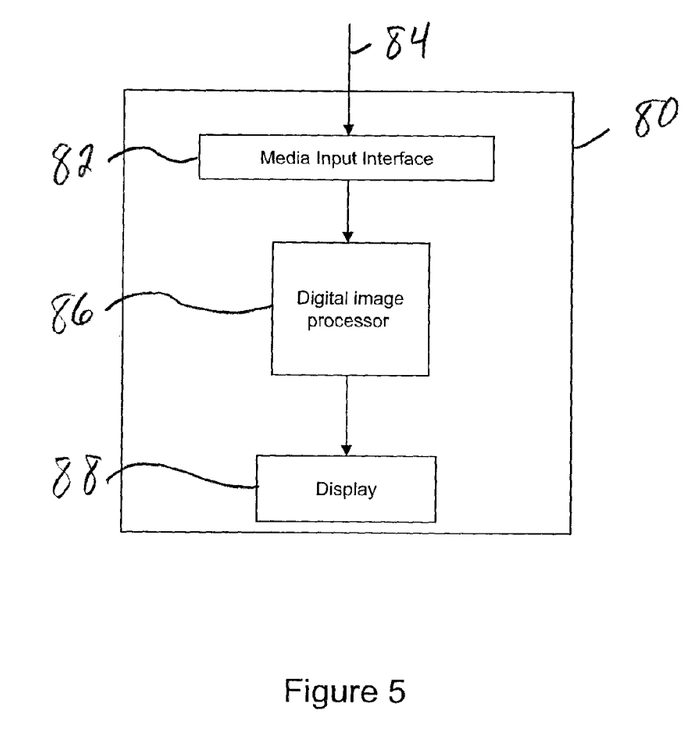
FIG. 5 is a block diagram of an example of a video display system.

FIG. 5 is a block diagram of an example of a video display system. A video display system 80 comprises a media input interface 82 for receiving a video signal 84. A digital image processor 86 edits images of the video signal 84 according to a user profile and according to a device parameter of the video display system 80. A display 88 is for displaying processed images from the digital image processor 86.

Figure 6:
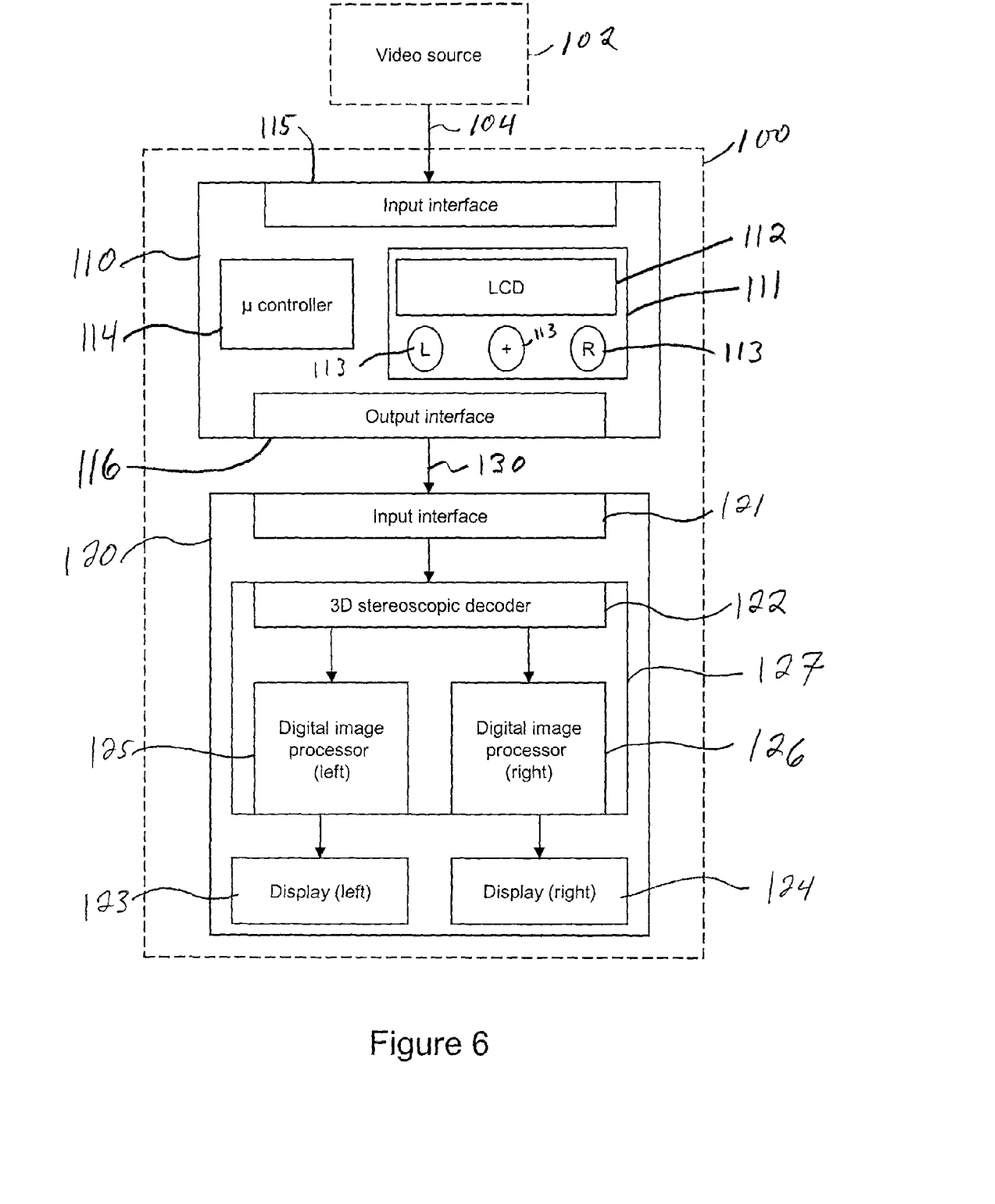
FIG. 6 is a block diagram of a video headset system according to an embodiment.

The method of FIG. 1 and the digital image processor of FIG. 2 may be integrated in a user wearable headset. FIG. 6 is a block diagram of a video headset system according to an embodiment. FIG. 6 provides a non-restrictive, illustrative embodiment of a video display system. The shown embodiment is concerned with an integrated field-configurable headset system 100 connectable to a video source 102 for receiving a video signal through a wired or wireless communication link 104.

The headset system 100 comprises a base station 110 comprising an input interface 115 connectable to the communication link 104. The input interface 115 may be compatible with a high definition media interface, which may be compliant to a high definition multimedia interface (HDMI) standard v1.3 or later version, in order to enable input of high quality dual channel video material such as stereoscopic material to provide a realistic viewing experience. Of course, other video signals may be received from the source via other types of connections, including for example an S-video connection, an RGB connection, a DisplayPort connection, a category 5 cable connection, and the like. The base station 110 is also provided with an output interface 116, for example an HDMI output interface, for forwarding the video signal, plus any internally generated information, to a head mounted device (HMD) 120 through a wired or wireless communication link 130.

The base station 110 further comprises a user interface 111 comprising a read-out display 112, for example a liquid crystal display (LCD), for communicating textual information to a user, and at least one button switch such as 113 to enable a user to input information into the headset system 100. Communication with the user may be menu driven by the system through a processing unit (micro-controller) 114, which comprises data storage capabilities, located in the base station 110. Thereby, the user may be prompted to provide simple feedback to instructions or interrogations using a limited set of buttons 113 for receiving and storing device parameters related to the HMD 120 and parameters forming a user profile.

The HMD 120 comprises an input interface 121, which may comprise HDMI decoding capabilities for decoding a high definition media program communicated from the source 102 through the base station 110. The input interface 121 also receives additional information generated at the base station 110. As expressed hereinabove, a video signal from the video source may comprise a lesser definition signal received on another type of interface, in which case HDMI decoding capabilities may be omitted.

The HMD 120 may comprise a single display. For 3D applications, the video signal from the input interface 121 may be processed through a 3D stereoscopic decoder 122 to generate first and second flows of images respectively dedicated to the left and right eyes of a user through a left micro-display 123 and right micro-display 124. A stereoscopic implementation of the HMD 120 also comprises a left digital image processor 125 and a right digital image processor 126. Of course, for monoscopic applications, a single digital image processor may be present.

Although the embodiment of FIG. 6 contemplates physically splitting of the system's functions into separate components, for example by separating the base station 110 from the HMD 120, all of these components may alternatively be integrated into a single headset, if found more convenient for any reason. For example, separate power supply circuitry (not shown), a casing for the base station 110, and the communication link 130, may be omitted when all components are integrated within the HMD 120. While the base station 110 may be used to create a simpler user interface for the user, a standalone HMD 120 with an augmented reality user interface is also possible. The arrangement of FIG. 6 is shown for the purpose of presenting a more elaborate embodiment being considered.

The digital image processors 125 and 126 effect high speed real time modifications of image frames of the video signal prior to displaying. In an embodiment, the digital image processors 125 and 126 separate each image frame of the video signal into image blocks of an image matrix, as presented in the foregoing description of FIG. 3. The digital image processors 125, 126 also define a conversion matrix. The conversion matrix is generally constructed based on two sets of information. A first data set comprises one or more device parameters of optical elements of the HMD 120, in particular the micro-displays 123 and 124. These device parameters may be resident into the device and take into account the intrinsic structure of the HMD 120. The device parameters may be used for compensating for aberrations of the video display system of the HMD 120. They may, for example, compensate for distortions and artifacts known to be generated by the HMD 120 hardware such as micro-displays 123, 124 and by other optical elements (not shown). In an embodiment, the device parameters may comprise user definable or user selectable parameters, which may be used to compensate for manufacturing tolerances of the optical elements of the HMD 120. A second data set forms a user profile constructed from user inputted information gathered through the user interface 111 to take into account personal selections or characteristics of the user. Non-limiting examples of user profile information may comprise adjustments related to a distance between the eyes of the user and the position of the micro-displays 123, 124, adjustments of myopia, color blindness, squinting, hyperopia and like aberrations of the eyes of the user, brightness, contrast and color adjustments, image blurring or sharpening, and even image distortion such as fisheye or warping, reflecting a user's personal taste. The conversion matrix is sized to match the image matrix, for example by comprising a number of conversion blocks corresponding to a number of image blocks of the image matrix.

User profile parameters and device parameters may be set specifically for a left side and for a right side of the HMD 120. It is therefore possible, for example, to separately edit the first and second image flows according to aberrations of a left eye and of a right eye of the user and according to aberrations of a left display and of a right display of the video display system.

Modifications made in the digital processing of the images may consist in digital remapping of a block array, or pixel array of the video images through the conversion matrix. The conversion matrix may thus for example redefine color and brightness parameters of any or all of the picture elements. Thereby, image properties such as geometric distortions, color, brightness and contrast may be edited on a block by block basis, or on a pixel per pixel basis, according to different criteria.

Device parameters forming the first data set and user profile parameters forming the second data set may be received and stored in the headset system 100 through the user interface 111, the user being prompted to provide feedback to questions or instructions displayed on the display 112 according to the aforementioned menu driven procedure, by operating the push buttons 113. User feedback may relate to a selection by the user amongst a set of pre-configured parameters for building the user profile and/ or for providing the device parameters. For example, a grid may be displayed on one or both of the micro-displays 123 and 124, and the user may be asked to hit a button to advance from a frame to another until grid lines are being perceived with optimal linearity or clarity, at which time another button is to be depressed to save the selection. Similar procedures may be implemented to carry out eye per eye configuration of the image processing parameters using standard calibration images. Of course, for some applications such as gaming, a user may actually make different choices in which linearity and clarity are replaced by some level of distortion.

Alternatively, the headset system 100 may be provided with a communication port (not shown) connectible to an external system and user interface. Such a port could also be used by an operator or service person to update operating functions of the headset system using a high level language.

The 3D stereoscopic decoder 122 and especially the digital image processors 124 and 125 may be implemented into a field-programmable gate array (FPGA) 127, providing high processing speed capabilities, reconfiguration flexibility for updating the user profile and device parameters or to adapt to future encoding/decoding standards.

Problems related to aberrations of a video display or to aberrations of the eyes of a user may be present in various types of applications. Those of ordinary skill in the art will readily appreciate that the present method of displaying a video signal, the present digital image processor and the present video display system may be adapted for other uses where a video signal is presented to a user on other types of displays besides those of a headset. They will also appreciate that monoscopic images may be processed and altered using the present method and processor. Consequently, references made herein to a stereoscopic, head mounted device (or headset), are exemplary and are not intended to limit the scope of the present disclosure.

Exemplary Embodiments

In an aspect, the present disclosure provides an integrated field-configurable headset that obviates the limitations and drawbacks of earlier devices and systems. In a particular embodiment, the present disclosure is concerned with a compact multiple screen display apparatus integrated into a headset or headset system, provided with means for editing inputted signals to display altered information on each screen. The editing means may be controlled to configure each display individually according to selectable parameters and to user characteristics. Parameters related to optical components within the headset and parameters related to characteristics of the eyes of the user may be selected by the user. Image edition may be made stereoscopically, on a screen by screen basis, according to user personal characteristics and/or parameters. Such processing may thus be effected based on information provided by a user and/or on data resident in the headset, yielding a specific configuration that may be established through an interactive procedure.

Although, some image processing systems have been provided in the past to compensate for aberrations incurred through a displaying system, no such system have been contemplating post-processing integrated at the HMD level, with or without integration of user provided information. Correction carried out at a processing computer can only anticipate defaults which are specific to a known display device in matched systems. Consequently, commercial media playing stations deliver a standard image format and do not support corrections taking into account the display system characteristics or user parameters or characteristics. Such configuration may be carried out in large display sets such as TV sets or monitors, but do not provide stereoscopic displays or account for differences between both user's eyes or multiple display channels. No image processing systems provided in the past can compensate for aberrations incurred through a displaying system while also accounting for user parameters or characteristics.

In an embodiment of a video display system, images may be post-processed at the level of a head mounted device (HMD). Aberrations specific to the intrinsic structure of the HMD as well as aberrations due to vision problems of the user may be corrected within the device itself, without affecting a standard output of video source, whether the video source is a camera, a computer or a gaming machine. It is also possible to enable edition of inputted images to provide added information such as in an augmented reality context, or user personal characteristics evaluation. In the context of augmented reality, vision tests or psychological evaluation tests, it is possible to deliberately edit image signals received from a video source to display altered or enhanced images that may be modified differently for each eye. Challenges related to high processing speed involved, especially for high definition video signals, to the restricted physical space within a HMD, and to the gathering of information about user parameters, are overcome using the digital image processor and method described herein. The HMD of the present disclosure is sufficiently flexible to enable ongoing upgrade to new media information encoding and processing standards, and to user defined operating functions.

Some embodiments relate to an integrated field-configurable headset comprising a standard media input interface, for example a high definition media interface (HDMI) decoder, a stereoscopic image decoder for generating left and right image flows, digital image processors for editing the image flows, and display means for displaying images from the digital image processors. The headset may also comprise a user interface for defining a user actionable switch that defines a read-out display. In some other embodiments, the field-configurable headset may be part of a system comprising a base station that comprises a user interface and that is adapted to communicate with the headset. The user interface may comprise a data communication port connectible to an external system comprising an input device and a display device. The user interface may be integrated into a head mounted device and/or located into a base station of the system.

The headset may further comprise a field-programmable gate array (FPGA). The FPGA may at least in part define the standard media input interface and/or the stereoscopic decoder and/or the first and second image processors.

The digital image processors may carry out digital image remapping at a pixel level according to image conversion information. The image conversion information may comprise parameters defined by configuration, predetermined parameters and/or data resident in the HMD. The image conversion information may also comprise information specific to a user profile. The specific information may be gathered by the headset system through the user interface.

It can thus be easily appreciated that the above-described non-restrictive illustrative embodiments of the field-configurable headset and system according to the present disclosure obviate the above-discussed limitations and drawbacks of the existing apparatuses and systems. Indeed, digital image processors 125 and 126 may be conveniently loaded with material dependent parameters and user dependent parameters to generate a specific configuration of the left eye image processing and right eye image processing for providing optimal display conditions and viewing experience for given material set-up and manufacturing cost. Furthermore, the field programmable headset and system may be conveniently updated to future media processing standards without changes to the material structure (hardware).

Those of ordinary skill in the art will realize that the description of the devices and methods for digitally processing video signals are illustrative only and are not intended to be in any way limiting. Other embodiments will readily suggest themselves to such persons with ordinary skill in the art having the benefit of this disclosure. Furthermore, the disclosed method, image processor and video display system may be customized to offer valuable solutions to existing needs and problems of digital image processing.

Those of ordinary skill in the art will also appreciate that numerous types of visual display systems or other apparatuses may embody aspects of digital image processing as disclosed herein.

In the interest of clarity, not all of the routine features of the implementations of the method, image processor and video display system are shown and described. It will, of course, be appreciated that in the development of any such actual implementation of the digital image processing, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of image processing having the benefit of this disclosure.

In accordance with this disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, application specific integrated circuits (ASICs), or the like, may also be used. Where a method comprising a series of process steps is implemented by a computer or a machine and those process steps may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An integrated field-configurable headset system connectable to a video source including at least one camera and/or a computer for receiving a video signal through a wired or wireless communication link, the headset system comprising:
   a head mounted device to be worn by a user for displaying a video image to the user, the head mounted device comprising:
      a data image processor integrated within the head mounted device for effecting high speed real time modification of image frame of the video signal, a 3D stereoscopic decoder implemented into the data image processor for generating left and right image flows and first and second digital image processors implemented into the data image processor for respectively editing the first and second image flows;
      a compact multiple screen display apparatus integrated into the head mounted device and defining a video display comprising a right micro-display and a left micro-display in communication with the data image processor for displaying augmented reality processed images from the data image processor each of the pair of digital processors being in communication with a respective one of the right and left micro-displays in order to effect high speed real time modifications of image frames of the video signal prior to displaying via the micro-displays; and
      optical elements integrated in the head mounted device, the optical elements are of the kind to provide a wide field of view to improve immersion of the viewing experience to be as realistic as possible; and
   a base station comprising:
      a processor which comprises data storage capabilities;
      a user interface for providing the user to select from amongst a set of pre-configured parameters displayed by the video display for building a user profile and storing the user profile in the processor;
      an input interface connectable to the communication link; and
      an output interface for forwarding the communication signal to the video display,
   wherein the data image processor provides for real-time processing of the video signal according to;
      (i) the stored user profile thereby compensating for an aberration in the eye of the user and the distance between the eyes of the user and the position of the video display;
      (ii) both the stored user profile and a device parameter thereby compensating for the fish eye effect generated by the optical elements that provide the wide field of view;
      (iii) a device parameter for compensating for an aberration of the video display, a distortion of the micro-displays and an aberration of the video signal, wherein the video signal is form of a red component, a green component and a blue component, wherein different wavelengths of the red, green and blue components lead to different aberrations of the eyes of a user, of components of the video display, and of perceptions of the user, the data image processor separately processes the red component, the blue component and the green component to compensate for the different aberrations,
   thereby providing for the data image processor to compensate at the level of the head mounted device for distortions and/or aberations due to the eyes of the user, the optical elements, the video display, and the video signal while also accounting for the user profile prior to the augmented reality video image to the user.

2. A headset system according to claim 1, wherein the user interface is integrated to the head mounted device.

3. A headset system according to claim 1, wherein the base station is integrated to the head mounted device.

4. A headset system according to claim 1, wherein the video signal comprises a left component and a right component, the data image processor provides for separately processing the left component and the right component.

5. A headset system according to claim 4, wherein the data image processor processes the left component according to a parameter of a left eye of the user, and processes the right component according to a parameter of a right eye of the user.

6. A headset system according to claim 4, wherein the data image processor processes the left component according to a parameter of a left component of the video display system; and processes the right component according to a parameter of a right component of the video display system.

7. A headset system according to claim 1, wherein the data image processor provides for separately editing the first and second image flows according to aberrations of a left eye and of a right eye of the user and according to aberrations of a left display and of a right display of the video display system.

8. A headset system according to claim 1, wherein the data image processor provides for dividing each image of the video signal into image blocks of an image matrix, and for defining a conversion matrix sized to match the image matrix, the conversion matrix comprising conversion blocks sized to match the blocks of the image matrix, wherein digitally processing the video signal comprises compensating each image block using a corresponding conversion block, wherein the conversion is selected from the group consisting of: a color conversion, generating a bitmap representation of the image, or to a transformation from a time domain to a frequency domain or any combination thereof.

9. A headset system according to claim 1, wherein the data image processor provides for defining a pixel-wise conversion matrix, wherein digitally processing the video signal comprises compensating each pixel of the video signal with a pixel of the conversion matrix, wherein the conversion is selected from the group consisting of: a color conversion, generating a bitmap representation of the image, or to a transformation from a time domain to a frequency domain or any combination thereof.

10. A headset system according to claim 1, wherein the video display merges video signals from a plurality of video source.

\* \* \* \* \*